United States Patent
Luck et al.

(10) Patent No.: US 8,785,817 B2
(45) Date of Patent: *Jul. 22, 2014

(54) METHOD AND APPARATUS FOR WIRELESS REMOTE CONTROL COMMUNICATION OF A WELDER

(75) Inventors: John A. Luck, Appleton, WI (US); Stephen P. Ferkel, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 2018 days.

This patent is subject to a terminal disclaimer.

(21) Appl. No.: 11/560,773

(22) Filed: Nov. 16, 2006

(65) Prior Publication Data

US 2008/0116186 A1 May 22, 2008

(51) Int. Cl.
*B23K 9/10* (2006.01)

(52) U.S. Cl.
USPC .................. 219/132; 219/130.1; 219/137.7

(58) Field of Classification Search
USPC ............... 219/132, 130.1, 130.51, 137.7
See application file for complete search history.

(56) References Cited

U.S. PATENT DOCUMENTS

| | | | |
|---|---|---|---|
| 3,567,902 A | 3/1971 | Stearns et al. | |
| 4,216,367 A | 8/1980 | Risberg | |
| 5,136,139 A * | 8/1992 | Gilliland | 219/137 PS |
| 6,531,673 B2 | 3/2003 | Fedorcak | |
| 6,841,752 B2 | 1/2005 | Ward | |
| 7,045,742 B2 * | 5/2006 | Feichtinger et al. | 219/132 |
| 7,245,875 B2 * | 7/2007 | Clark et al. | 455/41.1 |
| 7,257,465 B2 * | 8/2007 | Perez et al. | 700/284 |
| 2004/0260407 A1 * | 12/2004 | Wimsatt | 700/19 |

FOREIGN PATENT DOCUMENTS

| | | |
|---|---|---|
| EP | 1112800 A1 | 7/2001 |
| EP | 1380377 A2 | 1/2004 |
| EP | 1681122 A1 | 7/2006 |
| WO | 02085566 A1 | 10/2002 |
| WO | WO 02086656 A2 | 10/2002 |
| WO | WO 02095323 A1 | 11/2002 |

OTHER PUBLICATIONS

Wireless Universal Serial Bus Specification, Revision 1.0, May 12, 2005.

* cited by examiner

*Primary Examiner* — Henry Yuen
*Assistant Examiner* — Ayub Maye
(74) *Attorney, Agent, or Firm* — Fletcher Yoder P.C.

(57) ABSTRACT

A method and apparatus of communicating control signals to a welding power source from a remote location includes a welding system operated by control signals transmitted by a wireless remote control that can be remotely located from the welding power source. A plurality of welding parameters in the welding system are set and adjusted in response to wireless command signals transmitted to a controller including a control transceiver located on the welding power source. In this regard, an operator is able to quickly and efficiently control a welding system from a remote location, with no more cables than are necessary to perform the intended task.

20 Claims, 2 Drawing Sheets

METHOD AND APPARATUS FOR WIRELESS REMOTE CONTROL COMMUNICATION OF A WELDER

BACKGROUND OF THE INVENTION

The present invention relates generally to welding machines and, more particularly, to a method and apparatus of communicating control signals to a welding power source from a remote location. Specifically, the invention relates to a welding system whose operation is governed by control signals transmitted by a wireless control panel. A plurality of welding parameters in the welding system are set and adjusted in response to wireless command signals received by the welding power source. In this regard, an operator is able to quickly and efficiently control a welding system from a remote location, with no more cables than are necessary for welding.

Welding and cutting are essential operations in many different areas of manufacturing and construction in today's economy. The versatility and efficiency of welding and cutting systems is vital to, and allows for, the efficient completion of many complex and dynamic welding operations. In many welding and cutting processes performed by operators, welding-type systems are adjusted during the process to accommodate several different welding-type operations. When the need for such adjustments arise, the welding parameters in the welding-type system need to be properly set for each different welding-type process. In each of these processes, parameters need to be set and adjusted prior to and during the welding-type process. In many instances, the welding-type process takes place at a distance from the actual welding machine/power source. Thus, an operator is required to walk back to the machine to make any necessary adjustments. To overcome this problem, some welding-type systems have started to incorporate some form of remote control. In many existing systems, power and communications between an operator location and a welding-type power source location are transmitted over cables. These cables provide a simple and reliable means for communication and control of various welding parameters.

Despite the benefits of such a set-up, there are also numerous drawbacks associated with communication and control of the welding-type system in such a manner. One drawback to this cable-based control is that the communications cable is typically fragile relative to the welding cables designed to carry high currents at high voltages. Welding-type systems are often used at sites where it is not uncommon for the systems to be periodically relocated or surrounded by other mobile heavy equipment operating in the same area. As such, the remote control communications cable can become damaged by being crushed or snagged from contact with surrounding machines and/or traffic. This can cause damage to the welding-type power source if internal power conductors become shorted to signal leads that are connected to sensitive signal level circuitry and obviously reduce productivity.

Communications cables for remote control of a welding device also produce additional concerns. One of these concerns is the introduction of high frequency electrical noise to the welding-type system, which occurs because of the high voltages present in the environment surrounding the communications cable. The communications cable provides a conduit for the noise to enter the power source and controller of the welding-type system. This noise and interference must be filtered out so as not to negatively affect the performance of the system.

Because of the numerous drawbacks associated with communication cables for remote control of a welding-type system, attempts have been to modify the manner of communication in newer systems. Various types of remote control devices have been introduced to facilitate operator control of the welding-type processes thru a means other than just a standard communications cable. However, a need still remains for a remote device capable of controlling all aspects of a welding operation in a manner that is practical and efficient for an operator.

A remote control device that is easily handled by an operator and which can wirelessly control a plurality of welding processes is a feature that would greatly enhance welding productivity and longevity of a welding system. Eliminating the communications cord with a wireless remote control would overcome many of the problems associated with high frequency electrical noise as described above. A wireless remote control would also provide for many benefits and conveniences for an operator, such as reducing the inconvenience of extra cables. Removal of a communication cord also would eliminate the possibility of communications being damaged due to sparks, hot metal and heavy objects falling on the cord and increase portability of a welding system. The elimination of extra cords also would allow for more convenient use of the welding system in confined areas.

BRIEF DESCRIPTION OF THE INVENTION

The present invention overcomes the aforementioned drawbacks and adds the stated benefits by providing a welding-type system capable of wirelessly controlling various welding parameters from a remote location. The welding-type system includes a welding power source having a control transceiver, a welding torch, and a wireless control panel capable of controlling a plurality of parameters in a welding system.

Therefore, in accordance with one aspect of the present invention, a welding-type system is disclosed that includes a power source having a controller to regulate welding operations and a welding torch connected to the power source. The system also includes a wireless control panel configured to remotely transmit a signal for controlling a plurality of welding parameters in the welding system. The controller is further configured to include a control transceiver to communicate with the wireless control panel and receive the signal and allow the controller to regulate at least one of the plurality of welding parameters in response thereto.

According to another aspect of the present invention, a remote control communication system for controlling a welding-type device is disclosed. The remote control communication system includes a wireless control configured to transmit a signal for controlling a plurality of welding parameters in a welding-type device. The system also includes a control transceiver configured to operate remotely from the wireless control and configured to receive and relay the signal to the welding-type device.

According to a further aspect of the invention, a method of remotely controlling a welding-type system is disclosed. The method includes the steps of wirelessly transmitting a signal indicative of desired operational parameters of the welding-type system, receiving the signal remotely, and controlling the welding type system in accordance with data embodied in the received wirelessly transmitted signal.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
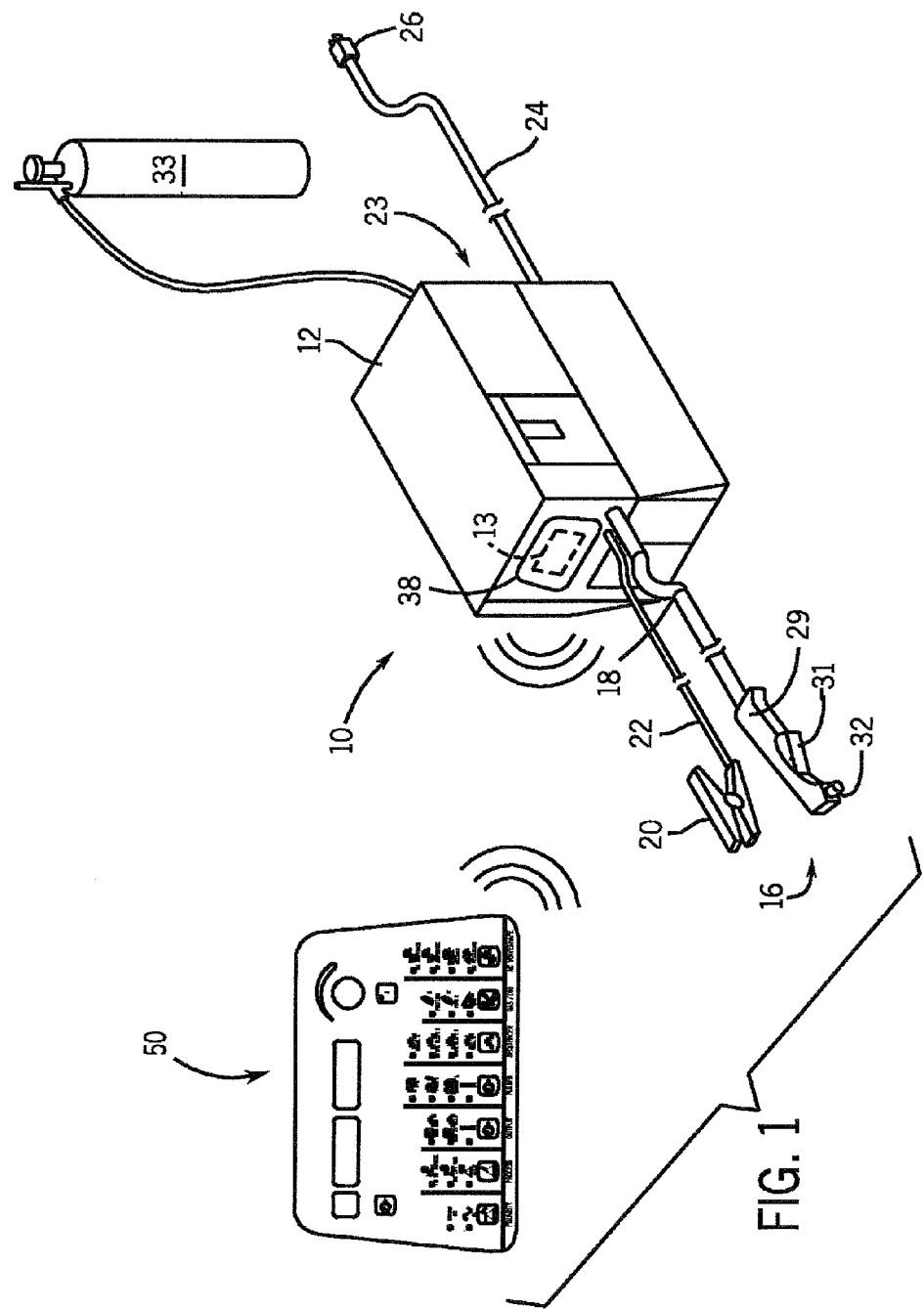
FIG. 1 is a perspective view of a welding-type system and remote control communication system for controlling a welding-type device according to the present invention.

FIG. 1 shows a welding-type system capable of performing various types of operations. FIG. 1 also shows a remote control communication system for controlling a welding-type device. The welding-type system 10 is merely representative of a wide variety of welding-type machines having various sizes, features, and ratings. The welding-type system, as contemplated herein, can be configured to not only perform standard welding type operations such as TIG, MIG, and/or stick welding, but can also be capable of performing various cutting operations that are closely associated with the various welding procedures, such as plasma cutting for example. In the exemplary embodiment of FIG. 1, the welding-type system shown is preferably a tungsten inert gas (TIG) welding system, however, one skilled in the art will readily appreciate that it may be any related welding or cutting system, including those listed above. TIG welding system 10 includes a power source 12 to condition raw power and generate a power signal suitable for welding applications. Power source 12 includes a processor/controller 13 that receives operational feedback and monitors the operation of TIG welding system 10. Connected to power source 12 is a torch 16 via a cable 18. Cable 18 provides torch 16 with power and compressed air or gas, where needed. Torch 16 includes a handle portion 29, or torch body, having a trigger 31 thereon to actuate the torch and work tip 32 extending therefrom.

Also connected to power source 12 is a work clamp 20 which is designed to connect to a workpiece (not shown) to be welded and provide a return path. Connecting work clamp 20 to power source 12 is a cable 22 designed to provide the return path for the welding current from torch 16 through the workpiece and work clamp 20. Extending from a rear portion 23 of power source 12 is a power cable 24 having a plug 26 for connecting power source 12 to either a portable power supply (not shown) or a transmission line power receptacle (not shown). Also connected to the power source is a gas source 33 configured to supply a gas flow to the welding torch 16.

Also included in welding-type system 10 is a wireless control panel 50, which can be operated apart from the welding-type power source 12, to set and adjust operational parameters in the welding-type system 10. In one embodiment of the present invention, and as shown in FIG. 1, wireless control panel 50 is configured as a removable front panel transceiver that operates as a handheld remote control. Wireless control panel 50 is typically operated remotely from the welding-type power source 12 during a welding-type operation; however, it is also envisioned that wireless control panel 50 can remain attached to the power source 12 for performing a welding-type operation. When a welding operation is performed adjacent to power source 12, wireless control panel 50 is configured to remain attached to power source 12 via docking port 38 and adjusted by an operator. When the wireless control panel 50 is operated remotely from the welding-type power source 12, and when an operator has completed a welding-type process and wishes to store welding-type system 10, wireless control panel 50 can be connected back to the power source 12 by way of docking port 38. The wireless control panel 50 can be slid or snapped into place with docking port 38, located anywhere on the welding-type power supply 12, to allow for easy storage and movement of the welding-type system 10.

Wireless control panel 50 communicates with controller 13 via a control transceiver (not shown) included in the controller 13. Control transceiver is configured to receive and relay wireless signals from wireless control panel 50 to the controller 13 to process the received wireless data. Controller is further operatively connected to power source 12, and in this manner, wireless control panel 50 controls operation of the welding-type system 10 and sets or adjusts the various welding-type parameters.

Various means of communication can be used to wirelessly transmit signals from wireless control panel 50 to controller 13. In a preferred embodiment, radio control (RC) signals are used. However, other means of communication can include, but are not limited to, radio frequency (RF), cellular digital packet data, high speed circuit switched data, packet data cellular, general packet radio service, radio transmission technology, Bluetooth, IrDA, multi-channel multipoint distribution service, local multipoint distribution service, WiMAX, 802.11 Wi-Fi, infrared, UHF, VHF, and RIM. It is recognized that the mode of communication selected will depend on the specific needs of the welding-type process and on the environment in which the process is being performed in.

Figure 2:
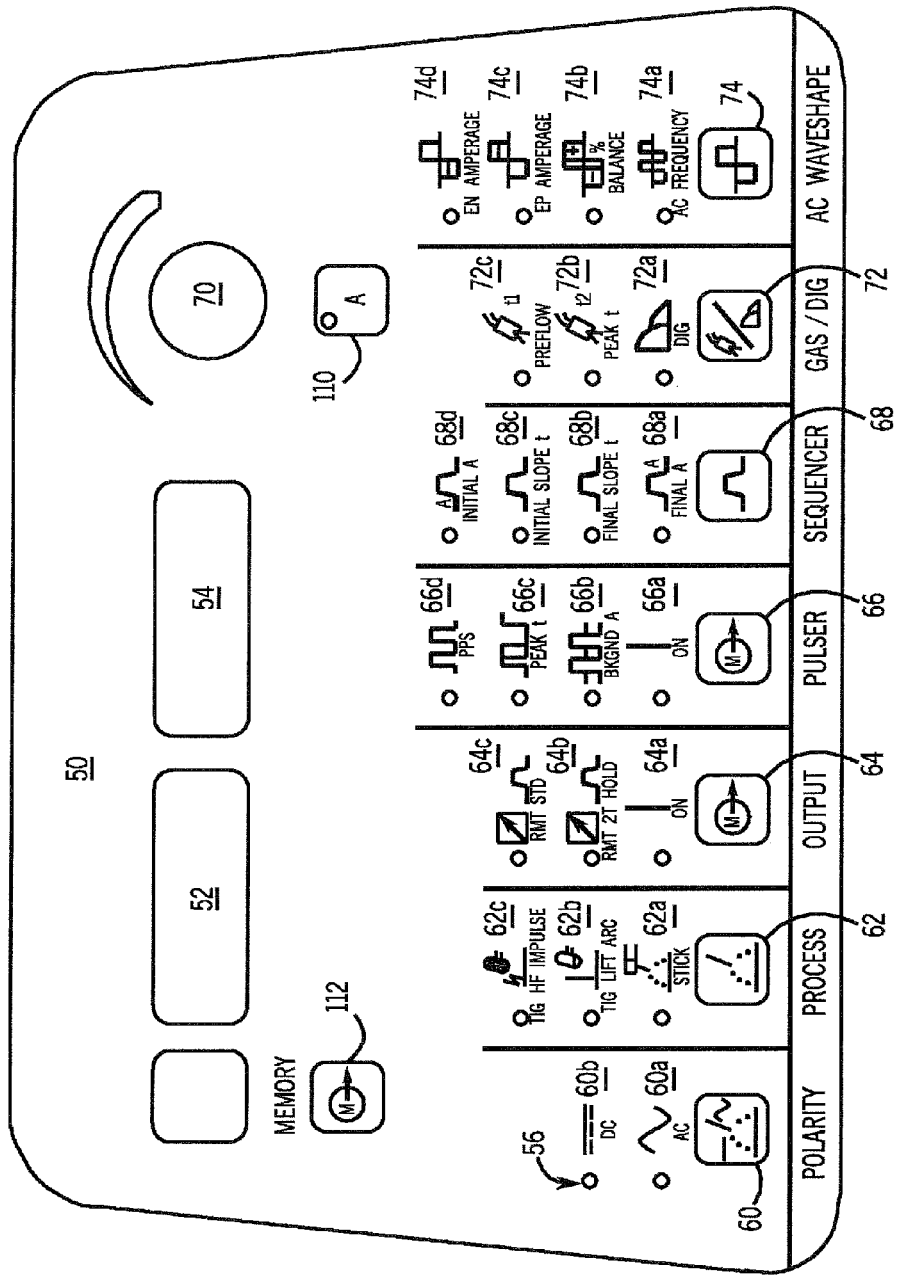
FIG. 2 is a schematic view of a wireless control panel useable with the system of FIG. 1.

Referring now to FIG. 2, a detailed view of one exemplary wireless control panel 50 is shown. This wireless control panel 50 is configured to be a handheld remote control operable with TIG and stick welding operations; however, it is also envisioned that a wireless control panel 50 with different selectors can be used to operate a MIG welding or plasma cutting operation. Wireless control panel 50 is configured to transmit a signal for controlling at least one of a plurality of welding-type parameters in the welding-type device. These controllable welding parameters can include, but are not limited to, current, voltage, inductance, pulse commands, and/or gas flow. To control these parameters, wireless control panel 50 can be configured to include a multitude of controls. The exact mechanisms found on wireless control panel 50 for performing these functions can vary, although as shown in FIG. 3, an adjustment selector dial 70 can be used to adjust the welding parameters listed above. In the preferred embodiment, wireless control panel 50 also includes process mode selectors 60, 62. Process mode selectors are configured to allow an operator to select a desired welding process to be performed. Each welding process that can be selected has operational set points associated therewith for at least one of a plurality of welding parameters. As such, an operator can switch between operational modes (i.e., cut vs. gouge, etc.) by way of the process mode selectors 60, 62.

The preferred embodiment of wireless control panel 50 includes a plurality of selectors (discussed below) for adjusting the various operating parameters of welding-type device 10 and a plurality of indicia, such as, multi-purpose displays 52, 54 for indicating amperage, voltage and other operating parameters and light emitting diodes (LEDs) 56 for indicating selected or preferred parameter settings. "Selector", as used herein, includes any or a combination of a plurality of selectors, such as analog, digital, discrete-position analog, toggle, dial and rotary, membranes and discrete push-button switches, and displays having a number of options from which the operator may select by, for example, scrolling through menus or touching a screen. The particular selected selector circuit, device, or means is not consequential to this invention.

As stated earlier, the plurality of operating parameter selectors on wireless control panel 50 includes a plurality of welding process mode selectors 60, 62, to enable the operator to toggle through and select the desired welding process. That is, an operator can toggle through process modes 60A, 60B, 62A, 62B, 62C by repeatedly processing selectors 60, 62. Operator can initially select a polarity for the desired welding process by selecting AC polarity indicator 60A or DC polarity indicator 60B. To further select the desired welding process, operator can then select a TIG or stick welding operation by selecting TIG lift arc indicator 62A, TIG HF impulse indicator 62B, and stick indicator 62C. Thus, an operator can select an AC TIG lift arc process by selecting 60A and 62B, an AC TIG HF impulse process by selecting 60A and 62C, and an AC stick process by selecting 60A and 62A. Similarly, an operator can select a DC TIG lift arc process by selecting 60B and 62B, a DC TIG HF impulse process by selecting 60B and 62C, and a DC stick process by selecting 60B and 62A. In this particular embodiment, the indicator each include an LED 56 that lights-up when the indicator is chosen. The toggling feature of welding process mode selectors 60, 62, only allows one specific welding process to be selected at a time, and LEDs 56 will be lit only next to the chosen process. When a desired welding operation has been selected via selectors 60, 62, a signal is sent to controller 13 indicating the desired welding process, and this signal is relayed to the power source 12 to provide the necessary welding inputs for the selected process.

The operating parameters of the selected welding process can be further modified by adjusting other parameter selectors on wireless control panel 50. AC waveshape selector 74 can be used to adjust the frequency of an AC welding process. The operator can select the AC frequency indicator 74A. In response, multi-purpose display 54 shows the currently selected frequency. The operator may then adjust this frequency by rotating adjustment selector dial 70. In a similar manner, the electrode negative (EN)-to-electrode positive (EP) balance of the AC waveform can be adjusted by toggling to the AC balance indicator 74B and rotating adjustment selector dial 70. Also, the electrode negative (EN) amperage indicator 74D and electrode positive (EP) amperage indicator 74C can be used, along with adjustment selector dial 70, to adjust EN and EP amperage. The start mode of the welding cycle may be selected by toggling to one of TIG lift arc indicator 62B and TIG HF impulse indicator 62C. Lift arc starting is performed by controller 13 enabling the welding current, the operator touching the electrode to the workpiece, and the operator lifting the electrode to form the arc. HF impulse starting involves the use of a high frequency signal that initiates the arc by jumping the gap between the electrode and the workpiece.

Other parameter selectors in this embodiment include a pulser selector 66, having a pulse on/off indicator 66A, a pulses/second indicator 66D, a peak time indicator 66C and a background amperage indicator 66B. When the operator selects pulse on/off indicator 66A to enable a pulse mode of operation, controller 13 controls power source 12 to give a pulse of full amperage (the magnitude of which may be selected via a main/peak amperage selector 110 along with rotating adjustment selector 70), followed by a pulse of reduced amperage (the percentage of peak magnitude which may be selected via background amperage indicator 66B). The pulse frequency may be selected via pulses/second indicator 66D and the peak time may be selected via peak time indicator 66C. This feature allows the weld puddle to solidify between filler wire applications, thus providing better puddle control and preventing the welder from melting holes in the workpiece.

A gas/dig selector 72 allows an operator to select percent dig indicator 72A, gas pre-flow indicator 72C or gas post-flow indicator 72B, all of which may be used to further optimize the welding process. Dig control increases the welding amperage at lower arc voltages to facilitate arc starting and to aid in making overhead and vertical welds. Dig control may also be desirable during stick welding to prevent the electrode from sticking to the base metal or workpiece. Gas pre-flow indicator 72C and gas post-flow indicator 72B are used to set gas flow rates before and after a welding process to further optimize torch 16 startup and facilitate proper cooling of the torch 16 after welding has been completed.

An output selector 64 controls how welding output is turned on and off. Selection of output-on indicator 64A powers output terminals of welding power supply 12. RMT STD indicator 64B activates a maintain switch to activate power output on and off. RMT 2T indicator 64C activates a temporary switch function that maintains output current in the power source 12 until the switch is activated two times.

A sequencer selector 68 is operable to further control the welding current. An initial amperage indicator 68D allows the operator to adjust an initial current which is supplied to the arc before the welding current rises to its main/peak current, selected by main/peak amperage selector 110. This initial current provides a better start in TIG welding processes. A final amperage indicator 68A allows the operator to adjust a final welding current which is supplied to the arc at the end of a welding cycle. An initial slope indicator 68C allows the operator to adjust the slope with which the welding current will ramp upward from the initial current to the main/peak current. A final slope indicator 68B allows the operator to adjust the slope with which the welding current will ramp downward from the main/peak current to the final current.

A memory selector 112 allows the operator to save in memory various configurations of a particular welding process and the parameters associated therewith. The memory selector 112 may be pressed to recall a set of previously selected or programmed operating parameters, of which a particular configured process may be selected by rotating the adjustment selector dial 70.

While one embodiment of wireless control panel 50 has been shown and described with reference to FIG. 2, one skilled in the art will appreciate that wireless control panel 50 may contain greater, fewer, or different selectors than those shown for adjusting the operating parameters of welding-type system 10. For example, an alternate embodiment of the present invention for a MIG welding system or plasma cutting system will include different parameter selectors (e.g., a wire feed speed selector for MIG welding) than those shown for the stick/TIG welding device of this embodiment. Additionally, as mentioned above, wireless control panel 50 may take various forms, including a configuration as a removable front panel transceiver or as a separate stand alone remote control. Accordingly, the present invention is not intended to be limited by the specific welding device or operating parameters set forth in FIGS. 1-2.

As one skilled in the art will readily appreciate, the aforementioned description of welding-type systems not only includes welders, but also includes any system that requires such enclosures and/or high power outputs, such as heating and cutting systems. Those skilled in the art are well acquainted with such welding-type devices, and as used herein, the term is given its ordinary meaning to those skilled in the art of welding and cutting apparatus.

Therefore, the present invention, including welding-type systems, is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting, or any similar systems.

Therefore, in accordance with one embodiment of the present invention, a welding-type system is disclosed. The welding-type system includes a power source having a controller to regulate welding operations and a welding torch actuated by a trigger and connected to the power source. The system also includes a wireless control panel configured to remotely transmit a signal for controlling a plurality of welding parameters in the welding system. The controller is further configured to include a control transceiver to communicate with the wireless control panel and receive the signal and allow the controller to regulate at least one of the plurality of welding parameters in response thereto.

According to another embodiment of the present invention, a remote control communication system for controlling a welding-type device is disclosed. The remote control communication system includes a wireless control configured to transmit a signal for controlling a plurality of welding parameters in a welding-type device. The system also includes a control transceiver configured to operate remotely from the wireless control and configured to receive and relay the signal to the welding-type device.

According to a further aspect of the invention, a method of remotely controlling a welding-type system is disclosed. The method includes the steps of wirelessly transmitting a signal indicative of desired operational parameters of the welding-type system, receiving the signal remotely, and controlling the welding type system in accordance with data embodied in the received wirelessly transmitted signal.

The present invention has been described in the terms of the preferred embodiment and it is recognized that equivalents, alternatives, and modifications, aside from those expressly stated, are possible and within the scope of the appending claims.

What is claimed is:

1. A welder comprising:
    a power source having a controller to regulate a welding operation; and
    a wireless control panel configured as a removable front panel transceiver attachable to the power source and comprising a plurality of dedicated weld parameter selectors configured to control welding parameters of the power source, the wireless control panel configured to be secured to the power source and removed from the power source and to receive inputs for performing the welding operation both when secured to the power source and wirelessly when removed from the power source.

2. The welder of claim 1 wherein the wireless control panel includes at least one of a process mode selector, voltage adjust, current adjust, output contactor control, inductance or slope control, power on/off, pulse commands, voltage and current feedback displays, engine start/stop, glow plug/choke activation, program select, polarity control, AC waveform control and wirefeed speed.

3. The welder of claim 1 wherein the wireless control panel has a dial to adjust the welding parameters.

4. The welder of claim 1 wherein the welding parameters include current, voltage, inductance, and pulse commands.

5. The welder of claim 1 further comprising a docking port located on the power source to store the wireless control panel.

6. The welder of claim 1 wherein the wireless control panel communicates with the power source via one of a radio control (RC), radio frequency (RF), cellular digital packet data, high speed circuit switched data, packet data cellular, general packet radio service, radio transmission technology, Bluetooth, IrDA, multichannel multipoint distribution service, local multipoint distribution service, WiMAX, 802.11 Wi-Fi, infrared, UHF, VHF, and RIM.

7. The welder of claim 2 wherein the wireless control panel includes a process mode selector and wherein the process mode selector is configured to allow an operator to select a desired welding process, the desired welding process having operational set points associated therewith for welding parameters.

8. The welder of claim 5 wherein the wireless control panel is further configured to be a removable front panel transceiver configured to connect and detach to the docking port.

9. A remote control communication system for controlling a welding-type device comprising:
    a wireless control panel configured as a removable front panel transceiver attachable to a power source and comprising a plurality of selectors configured to control welding parameters of the power source, the wireless control panel configured to be secured to the power source and removed from the power source and to receive inputs for performing a welding operation both when secured to the power source and wirelessly when removed from the power source; and
    a controller system that includes a transceiver, the controller system configured to operate remotely from the wireless control panel and receive and relay signals from the wireless control panel to the welding-type device.

10. The remote control communication system of claim 9 wherein the wireless control panel is configured to wirelessly transmit the signals for controlling the welding parameters in the welding-type device.

11. The remote control communication system of claim 9 wherein the wireless control panel includes at least one of a process mode selector, voltage adjust, current adjust, output contactor control, inductance or slope control, power on/off, pulse commands, voltage and current feedback displays, engine start/stop, glow plug/chick activation, program select, polarity control, AC waveform control and wirefeed speed.

12. The remote control communication system of claim 9 wherein the wireless control panel includes a process mode selector and wherein the process mode selector is configured to allow an operator to select a desired welding process, the desired welding process having operational set points associated therewith for at least one of the welding parameters.

13. The remote control communication system of claim 9 wherein the welding parameters include current, voltage, inductance, and pulse commands.

14. The remote control communication system of claim 9 wherein the wireless control panel has a dial to adjust welding parameters.

15. The remote control communication system of claim 9 wherein the wireless control panel wirelessly communicates with the controller system via one of a radio control (RC), radio frequency (RF), cellular digital packet data, high speed circuit switched data, packet data cellular, general packet radio service, radio transmission technology, Bluetooth, IrDA, multichannel multipoint distribution service, local multipoint distribution service, WiMAX, 802.11 Wi-Fi, infrared, UHF, VHF, and RIM.

16. The remote control communication system of claim 10 wherein the controller system is configured to include a process transceiver to receive wireless signals from the wireless control panel and send feedback to the wireless control panel.

17. A method for remotely controlling a welding-type system comprising:

selecting a desired welding operation for the welding-type system from a process mode selector on a wireless control panel configured as a removable front panel transceiver attachable to a power source and further configured to be secured to the power source and removed from the power source and to receive inputs for performing a welding operation both when secured to the power source and wirelessly when removed from the power source, the wireless control panel having a pre-determined set of mode selections, each mode selection having pre-determined operational parameters associated therewith:

wirelessly transmitting a signal indicative of the pre-determined operational parameters associated with the mode selection from the wireless control panel;

receiving the signal remotely; and controlling the welding type system in accordance with data embodied in the received wirelessly transmitted signal.

18. The method of claim 17 wherein the desired operational parameters include at least one of current, voltage, inductance, pulse commands, voltage feedback, current feedback, and output activation.

19. The method of claim 17 further including the step of sending a return signal to the wireless control panel from a remotely located transceiver.

20. The method of claim 17 wherein selecting a desired welding operation comprises:

selecting one of an AC power signal and a DC power signal using a first control; and selecting one of a TIG lift arc welding process, a TIG high-frequency (HF) impulse welding process, and a stick welding process.

* * * * *